(12) United States Patent
Ruhnke

(10) Patent No.: US 9,122,277 B2
(45) Date of Patent: Sep. 1, 2015

(54) FLOW REGULATOR

(75) Inventor: Christof Ruhnke, Berlin (DE)

(73) Assignee: NEOPERL GMBH, Mullheim (DE)

( * ) Notice: Subject to any disclaimer, the term of this patent is extended or adjusted under 35 U.S.C. 154(b) by 0 days.

(21) Appl. No.: 11/795,944

(22) PCT Filed: Feb. 6, 2006

(86) PCT No.: PCT/EP2006/001017
§ 371 (c)(1),
(2), (4) Date: Jul. 24, 2007

(87) PCT Pub. No.: WO2006/082092
PCT Pub. Date: Aug. 10, 2006

(65) Prior Publication Data
US 2008/0115841 A1 May 22, 2008

(30) Foreign Application Priority Data

Feb. 5, 2005 (DE) .......................... 10 2005 005 433

(51) Int. Cl.
*F16K 15/14* (2006.01)
*G05D 7/01* (2006.01)

(52) U.S. Cl.
CPC ........... *G05D 7/0133* (2013.01); *Y10T 137/777* (2015.04); *Y10T 137/7869* (2015.04)

(58) Field of Classification Search
CPC ............. G05D 7/0133; Y10T 137/777; Y10T 137/7869
USPC ............ 137/517, 498, 859, 903, 843; 138/45, 138/46, 44
See application file for complete search history.

(56) References Cited

U.S. PATENT DOCUMENTS

| 1,553,323 | A | * | 9/1925 | Parks | 137/512.15 |
| 2,175,993 | A | * | 10/1939 | Lighton | 429/79 |
| 2,517,083 | A | * | 8/1950 | Carlson | 138/46 |
| 2,960,109 | A | * | 11/1960 | Wilson | 137/517 |
| 3,827,456 | A | * | 8/1974 | Sheppard | 137/859 |
| 4,436,111 | A | * | 3/1984 | Gold et al. | 137/498 |

(Continued)

FOREIGN PATENT DOCUMENTS

| EP | 0 969 233 A1 | 1/2000 |
| EP | 1 315 059 A2 | 5/2003 |

(Continued)

OTHER PUBLICATIONS

German Language Office Action dated Oct. 11, 2005 issued in corresponding German Patent No. de 10 2005 005 433.1.

*Primary Examiner* — Kevin Lee
*Assistant Examiner* — P. Macade Nichols
(74) *Attorney, Agent, or Firm* — Volpe and Koenig, P.C.

(57) ABSTRACT

Disclosed is a flow regulator, especially for insertion into a jet regulator in an outlet fixture, comprising an insertion member that is penetrated by at least one flow duct in an axial direction as well as a throttle element which forms a control gap along with the insertion member in order to allow a fluid to penetrate into the at least one flow duct. The aim of the invention is to create a flow regulator which allows for significantly greater durability during use while offering maximum ease of operation when fluid is discharged. Said aim is achieved by a flow regulator in which the throttle element is embodied as a dimensionally stable throttle cap that is supported in relation to the insertion member via an elastic spring element.

10 Claims, 3 Drawing Sheets

(56) References Cited

U.S. PATENT DOCUMENTS

Figure 1:
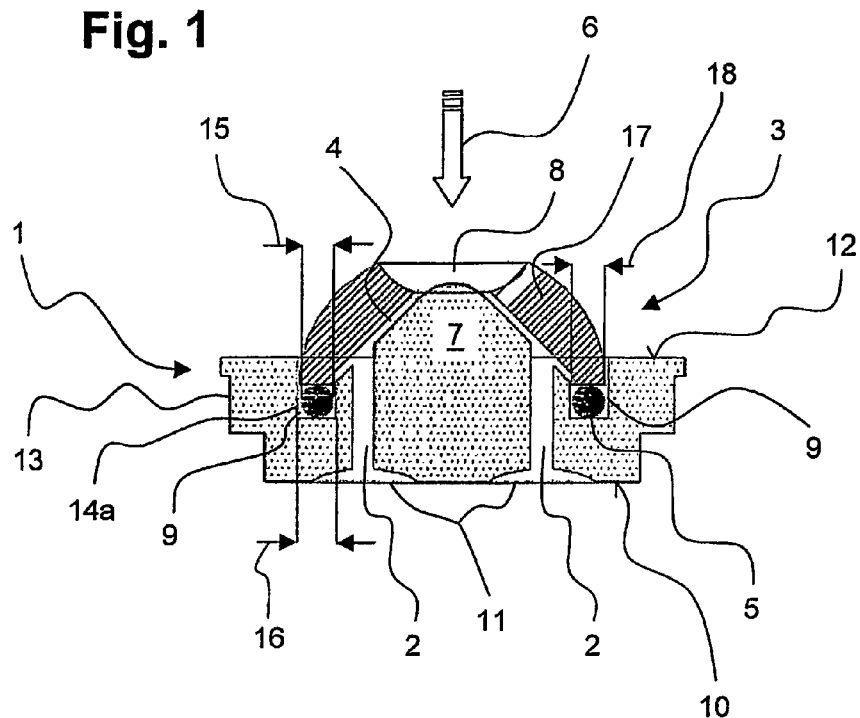

| | | | |
|---|---|---|---|
| 4,867,198 A * | 9/1989 | Faust | 137/503 |
| 5,226,446 A * | 7/1993 | Cooper | 137/517 |
| 5,653,257 A | 8/1997 | Johnston | |
| 2001/0015224 A1 | 8/2001 | Freigang et al. | |
| 2002/0189679 A1 | 12/2002 | Avis et al. | |
| 2003/0089409 A1 * | 5/2003 | Morimoto | 137/859 |
| 2006/0086399 A1 * | 4/2006 | Bailey | 138/45 |

FOREIGN PATENT DOCUMENTS

| | | |
|---|---|---|
| WO | WO 03/045352 A2 | 6/2003 |
| WO | WO 03/045353 A2 | 6/2003 |

* cited by examiner

FLOW REGULATOR

BACKGROUND OF THE INVENTION

1. Field of the Invention

The invention relates to a flow regulator, in particular for insertion in a jet regulator in an outlet fitting, with an insertion member that is penetrated in an axial direction by at least one flow duct, and a throttle element that, together with the insertion member, forms a control gap for the passage of a fluid into the at least one flow duct.

2. Description of Related Art

Such a flow regulator or constant flow holding device is disclosed for example in DE 102 20 287 A1. The known flow regulator features a regulator casing with a centrically arranged fastening post and a flow channel surrounding the latter. In the flow channel there is a throttle body made of an elastic material, with the throttle body being slid onto the fastening post which it encircles. A fluid flowing through the flow regulator deforms the throttle body due to a pressure differential generated by the flow through which reduces the free cross section of the flow channel. With increasing flow velocity, an additional dilation of the elastic throttle body is created and as well as an accompanying additional decrease in the free cross section of the passage channel. This limits the volume flow of the fluid.

The essential disadvantage of the known flow regulator lies in unsatisfactory long-term stability which is further reduced through calcifications, and a bothersome noise development during the fluid withdrawal.

Consequently, the invention is based on the task of creating a flow regulator that provides clearly improved durability in practical operation while allowing maximum handling ease during the fluid withdrawal.

BRIEF SUMMARY OF THE INVENTION

In accordance with the invention, the task is solved in a flow regulator in which the throttle element is constructed as a dimensionally stable throttle cap that is shored up supported with relation to the insertion member via an elastic spring element.

Dimensionally stable is to be understood as a material property that will not exhibit any deformation of the throttle cap under the fluid pressures that are to be expected under operating conditions. With increasing flow velocity of the fluid, the throttle cap is brought closer to the insertion member via the elastic spring element, resulting in a reduction of the effective cross section. This variable cross section represents the control gap.

A substantial advantage of the invention lies in the defined stress on the elastic spring element in one effective direction. In one advantageous execution model, the elastic spring element is stressed, for example, exclusively by means of a pressure force in the direction of the flow of the fluid via the throttle cap. In that case, no distension takes place on the elastic spring element nor on the throttle cap lying in the fluid stream.

Preferably, the elastic spring element is arranged outside of at least the one flow duct. In this execution model, the mechanically stressed elastic spring element is located outside of the fluid flow and is therefore exposed to clearly less thermal stress, especially in the case of hot fluids. The arrangement outside of the fluid flow also protects the elastic spring element from calcification and thus substantially increases the life of the flow regulator.

A distributor dome around which several flow ducts are circularly arranged may be formed centrically in the insertion member. In that case, the control gap may be formed by the distributor dome and the throttle cap. The distributor dome may have a shape corresponding to a cone, a truncated cone, a sphere, a hemisphere, a sphere segment or, respectively, a rotation paraboloid or an ellipsoid. The advantage of the sphere shape or a shape with a rounded surface vis-à-vis the cone shape lies in a larger surface of the distributor dome that is wetted by the fluid, which results in a greater force acting on the elastic spring element via the throttle cap.

Providing an inlet aperture for the fluid located centrically in the throttle cap proved to be particularly advantageous. Through this, the fluid entering the flow regulator is distributed evenly and the throttle cap is moved uniformly in a radial direction towards the insertion member or the distributor cap, without canting.

It is advantageous if the throttle cap is arranged in the flow direction before the insertion member. Then, the predominant portion of the throttle cap as well as the inlet aperture will be located in an axial direction outside of the insertion member. By way of this design, the insertion member can be made particularly short in its axial direction.

In the preferred embodiment, the throttle cap and the distributor dome have a convexed shape in the flow direction. In this case, the curvature of the throttle cap and of the distributor dome should be identical so that a control gap of uniform width will be formed in an axial direction. With an eye on the lowest production cost possible, the elastic spring element may be done as an O-ring, for example. The O-ring may be placed in the retaining groove that is ring-shaped as well. In the relaxed state of the O-ring, or, in general, of the spring element, the O-ring will be lying loosely in the retaining groove. Consequently, the production tolerances may be relatively large, which leads to a further reduction of production costs. Regardless, the retaining groove should allow a pressure deformation of the O-ring or of the elastic spring element in a radial direction.

It will be advantageous if the retaining groove is arranged concentrically around the distributor dome and/or the several slow ducts. This will lead to a uniform transmission of force, lower any vibrations during the through flow of the fluid and thereby contribute to an additional noise reduction as well as to a prolonged life of the flow regulator.

Preferably, the at least one flow channel will have a conically expanded outlet aperture on one outlet side of the insertion member.

The flow regulator according to the invention may also find use in a beverage vending machine. In the case of these beverage vending machines, a timed control device will suffice in order to allow a defined amount of a beverage to flow into a cup under constant pressure or, respectively, with a constant flow velocity.

BRIEF DESCRIPTION OF THE SEVERAL VIEWS OF THE DRAWING(S)

Figure 2:
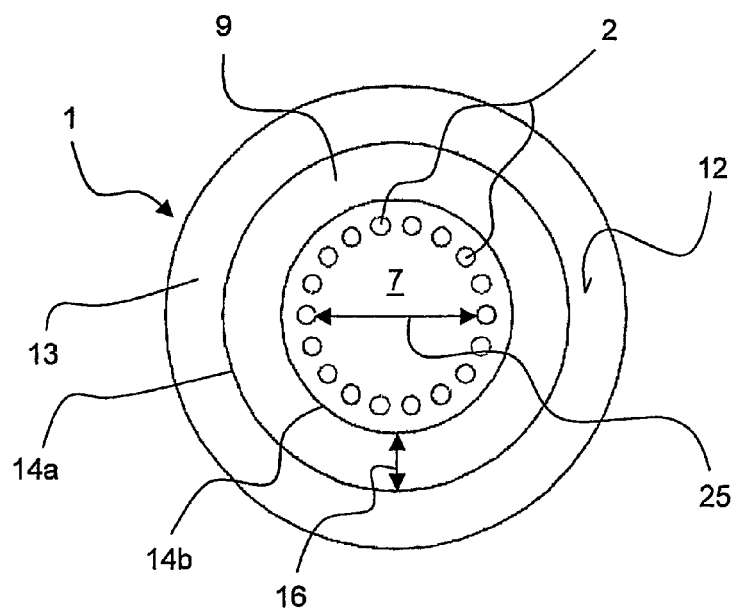
Figure 3:
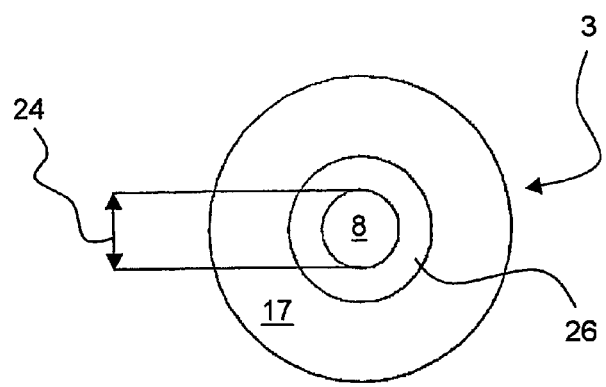
Figure 4:
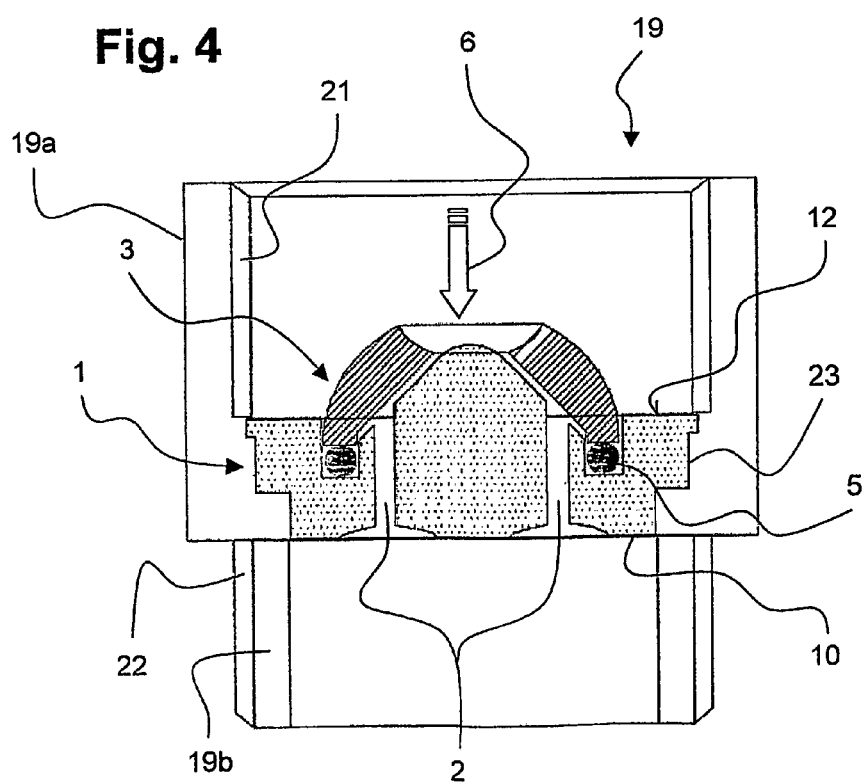
Figure 5:
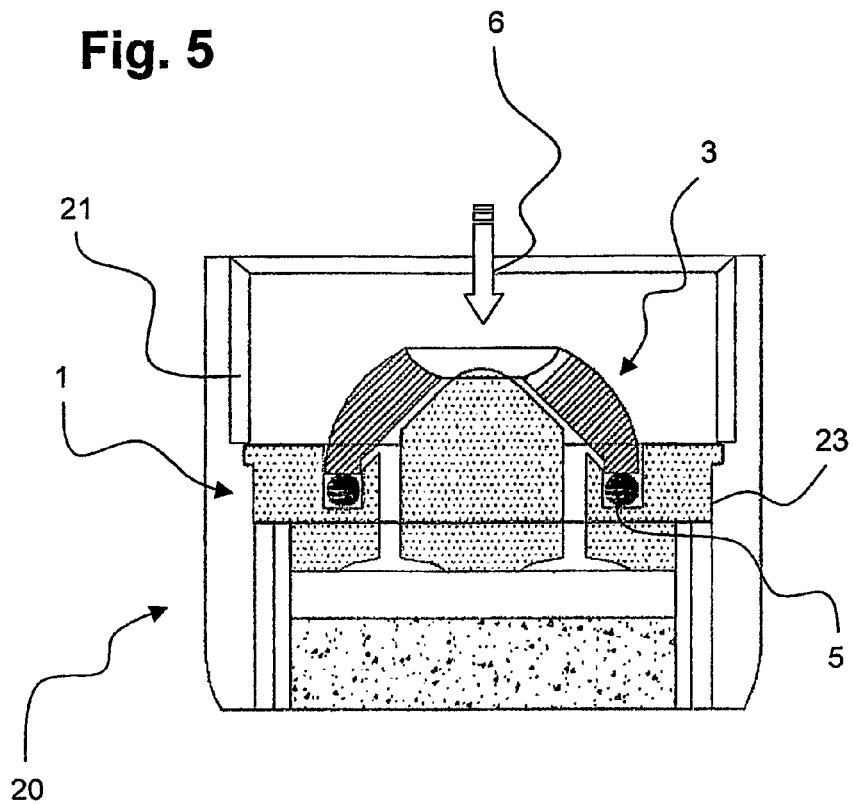

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. For a better understanding, the invention will be explained in detail by way of the following five drawings. Shown are in FIG. 1: a schematic cross section of a flow regulator;

FIG. 2: a top view of an insertion member with the throttle cap removed;

FIG. 3: a top view of a throttle cap;

FIG. 4: a schematic cross section of a flow regulator with a ½" screw connection; and FIG. 5: a schematic cross section of a flow regulator for installation in an aerator casing.

DETAILED DESCRIPTION OF THE INVENTION

FIG. 1 shows a cross section of a flow regulator with an insertion member 1 and a throttle cap 3 designed as a throttle element. In an installed state, a fluid, not shown, passes through the flow regulator in the direction of the flow 6.

The insertion member has a circumferential edge section 13 that closes with a level surface on one inlet side 12 facing the flow direction 6. On the side facing away from the flow direction 6, the insertion member 1 is formed with an even outlet side 10 that is parallel to the inlet side 12.

In a central area, a distributor dome 7 that tapers towards the flow direction 6 is arranged on the insertion member 1 that protrudes vis-a-vis the edge section 13. In a section lying below the inlet side 12 a multitude of flow ducts 2 are arranged in the distributor dome 7 in wreath-like fashion, of which the representation of FIG. 2 shows only 2 flow ducts 2 lying opposite each other. The flow ducts 2 run through the insertion member all the way from the inlet side 12 to the outlet side 10 and in each case expand in the outlet area with a funnel-shaped outlet aperture.

The external radial end of the distributor dome 7 transitions into a circumferential retaining groove that envelops the distributor dome 7 in circular fashion and whose external wall 14a is essentially aligned at a right angle to the inlet side 12. Loosely set into the retaining groove is an O-ring 15 whose cross section is chosen smaller than the width 16 of the retaining groove 9.

A throttle cap 3 rests on the O-ring 5. The throttle cap encompasses a dome-like circumferential wall 17 that is completely penetrated at its upper end by an inlet aperture 8. In this respect, the inlet aperture 8 is located centrically above the distributor dome 7 of the insertion member 1. The thickness 18 in the lower portion of the circumferential wall 17 is selected to be less than the width 16 of the retaining groove 9, which guarantees that the throttle dome 7 can be moved against the insertion member 1. A control gap 4 is formed between the distributor dome 7 and the internal side of the throttle cap 3.

During operation, the fluid passes through the throttle cap 3 in the direction of the flow and strikes the distributor dome 7 where a deviation of the fluid flow occurs, first into the control gap 4 and from there in the direction of the flow ducts 2. With increasing flow velocity within the control gap 4, the throttle cap 3 is suctioned towards it and thereby approaches the distributor dome 7, meaning that the control gap 4 becomes smaller and only a reduced fluid stream will flow through the flow regulator. By moving the throttle cap 3 towards the distributor dome 7, a pressure force is exerted on the O-ring 5 via the circumferential wall 17 of the throttle cap 3 which again leads to a deformation of the O-ring. With a reducing flow in the control gap 4, the suction force of the fluid decreases and the O-ring 5 resumes its original round cross section due to its material-immanent resilience. The control gap expands thereby, and a larger amount of fluid can pass through the insertion member 1. Consequently, it is possible to have a predetermined fluid stream flow through the flow regulator independently of the pressure level existing in the flow direction upstream of the flow regulator.

FIG. 2 shows a top view of the insertion member 1 without the throttle cap 3. At the radial external end and concentrically around the tip of the distributor dome 7, a total of 18 flow ducts 2 aligned parallel to each other can be seen. Outside of the flow ducts 2 the distributor dome 7 is bordered by the retaining groove 9 into which the elastic spring element 3, for example in the form of an O-ring 5, is placed (not shown in FIG. 2). The retaining groove 9 has an interior wall 14b aligned parallel to the exterior wall 14a, with the interior wall 14b as well as the exterior wall 14a standing vertical to the inlet side 12 in the area of the edge section 13.

FIG. 3 shows, also in a top view, the throttle cap 3 with its circumferential wall 17 rounded towards the outside. Located centrally within the throttle cap 3 is the inlet aperture 8 whose diameter is chosen smaller than the interior diameter 25 (see FIG. 2) of the flow ducts. Otherwise it would not come to the formation of a control gap 4 since the fluid would flow immediately from the inlet aperture 8 into the flow ducts 2. In a transitory area 26, the throttle cap 3 is provided with a plane surface that in an assembled state of the throttle cap 3 and of the insertion member 1 runs parallel to the inlet side 12 of the edge section 13.

FIG. 4 represents an application of the flow regulator in a ½" screw connection 19 for showers. The screw connection 19 comprises an initial large diameter section 19a and a subsequent small diameter section 19b. The large diameter section 19a has an interior thread 21 to anchor the screw connection 19 on a not-shown drain mechanism. The internal thread 21 extends in an axial direction up to approximately ⅔ of the overall length of the large diameter section 19a. The insertion member 1 of the flow regulator is arranged at the extreme end in the direction of the flow 6 directly following the internal thread 21. To this end, the insertion member 1 as well as the interior wall of the large diameter section 19a are provided with contours 23 adapted to each other in complementary fashion, whereby the insertion member is locked in place in form-fitting fashion in the direction of the flow 6. The throttle cap 3 protrudes into the large diameter section 19a counter to the direction of the flow 6.

The small diameter section 19b has an external thread 22 with which a screw connection, for example with a shower hose, can be established.

FIG. 5 shows an additional application of the flow regulator integrated in an aerator casing 20. The aerator casing 20 has an internal thread 21 with the aid of which an attachment, for example with a water faucet (not shown), can be realized. The flow regulator which is arranged in form-fitting fashion via contours of the insertion member 1 within the aerator casing 20 is located after the internal thread.

REFERENCE SYMBOL LIST

1 Insertion Member
2 Flow Duct
3 Throttle Element, Throttle Cap
4 Control Gap
5 Elastic Spring Element, O-Ring
6 Flow Direction
7 Distributor Dome
8 Inlet Aperture
9 Retaining Groove
10 Outlet Side
11 Outlet Aperture
12 Inlet Side
13 Edge Section 14a Exterior Wall Retaining Groove
14b Interior Wall Retaining Groove
15 O-Ring Cross Section
16 Retaining Groove Width
17 Circumferential Wall of Throttle Cap
18 Circumferential Wall Thickness
19 ½" Screw Connection for Showers
19a Large Diameter Section of the Screw Connection
19b Small Diameter Section of the Screw Connection
20 Aerator Casing
21 Internal Thread
22 External Thread
23 Contour
24 Inlet Aperture Diameter
25 Flow Duct Interior Diameter
26 Transition Area It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A flow regulator for insertion in a jet regulator in an outlet fitting with an insertion member that is penetrated in an axial direction by at least one flow duct, and
   a throttle element that, together with the insertion member, forms a control gap with a variable cross section for the passage of a fluid into the at least one flow duct,
   and the throttle element is formed as a dimensionally stable throttle cap that is supported in relation to the insertion member via an elastic spring element comprising an O-ring, wherein the insertion member has a distributor dome and the a retaining groove in which the elastic spring element is placed is arranged concentrically around the distributor dome and/or the at least one flow duct and the throttle cap is rounded or cone-shaped in a flow direction and the control gap is formed with a uniform width in an axial direction.

2. The flow regulator according to claim 1, wherein the elastic spring element is arranged outside of the at least one flow duct.

3. The flow regulator according to claim 1, wherein the elastic spring element is stressed by pressure force in the flow direction of the fluid via the throttle cap.

4. The flow regulator according to claim 1, wherein the distributor dome is arranged centrically in the insertion member, with several flow ducts being arranged circularly around said dome.

5. The flow regulator according to claim 1, wherein the distributor dome and the throttle cap form the control gap.

6. The flow regulator according to claim 1, wherein the throttle cap is equipped with a centrically arranged inlet aperture.

7. The flow regulator according to claim 1, wherein the throttle cap is arranged before the insertion member in the flow direction of the fluid.

8. The flow regulator according to claim 1, wherein the throttle cap has a convex shape in the flow direction of the fluid.

9. The flow regulator according to claim 4, wherein the distributor dome has a convex shape in the flow direction of the fluid.

10. The flow regulator according to claim 1, wherein the at least one flow duct has a conically expanded outlet aperture on one outlet side of the insertion member.

* * * * *